United States Patent
Witt et al.

(10) Patent No.: US 6,267,244 B1
(45) Date of Patent: *Jul. 31, 2001

(54) BAG FOR STORING AND DISPENSING CORD

(75) Inventors: Jerome M. Witt; Benjamin R. Groeser, both of Yuba City, CA (US); Morse L. Roberts, Sparks, NV (US)

(73) Assignee: Liberty Tool, LLC, Yuba City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/467,265

(22) Filed: Dec. 20, 1999

Related U.S. Application Data

(63) Continuation-in-part of application No. 08/665,162, filed on Jun. 14, 1996, now Pat. No. 6,026,962.

(51) Int. Cl.⁷ .................................................. B65D 85/04
(52) U.S. Cl. ............................ 206/702; 383/33; 383/119
(58) Field of Search .................................. 206/702, 388; 220/9.1; 174/135; 383/33, 35, 72, 105, 119

(56) References Cited

U.S. PATENT DOCUMENTS

| | | |
|---|---|---|
| 2,425,683 | 8/1947 | Martin . |
| 2,497,325 * | 2/1950 | Scherba .................................. 383/72 |
| 3,327,924 | 6/1967 | Brutting . |
| 4,290,468 | 9/1981 | Rosenbloom, Jr. . |
| 4,662,517 | 5/1987 | Wirth . |
| 4,688,674 | 8/1987 | Stirtz . |
| 4,713,033 | 12/1987 | Cameron . |
| 4,979,614 * | 12/1990 | Ruhaut ................................. 206/702 |
| 4,984,685 | 1/1991 | Douglas . |
| 5,103,977 | 4/1992 | Douglas . |
| 5,174,450 | 12/1992 | Upchurch . |
| 5,439,109 | 8/1995 | McBride . |
| 5,449,067 | 9/1995 | Cannon . |

OTHER PUBLICATIONS

Bob & Bob, Catalog, Dec. 1995, p. 8.
Feather River Mountaineering, Press Release, May 2, 1996, 1 page.

* cited by examiner

*Primary Examiner*—Paul T. Sewell
*Assistant Examiner*—Luan K. Bui
(74) *Attorney, Agent, or Firm*—Arthur J. Behiel

(57) ABSTRACT

A bag for storing and dispensing cord includes a sidewall formed from a pliable sheet of material. The sidewall defines an interior compartment having a central portion defined between two ends. In one embodiment, a resilient ring having sufficient stiffness to maintain the interior compartment in an at least partially uncollapsed shape when the bag lies on its side supports the central portion of the interior compartment. A cord is stored within the interior compartment with one end of the cord protruding through an aperture in the closed end and the other end of the cord protruding from the open end of the compartment. In one embodiment, an end cover attached to the sidewall forms the closed end of the bag.

17 Claims, 3 Drawing Sheets

BAG FOR STORING AND DISPENSING CORD

CROSS-REFERENCE TO RELATED APPLICATION

This application is a CIP of U.S. patent application Ser. No. 08/665,162 entitled "Bag for Storing and Dispensing Electrical Cord," by Witt et al., filed Jun. 14, 1996, U.S. Pat. No. 6,026,962, and incorporated herein by reference.

BACKGROUND

1. Field of the Invention

The present invention relates to devices used to store and dispense cord, and in particular to devices used to store and dispense electrical cord.

2. Discussion of Related Art

Many devices are currently available for storing and dispensing electrical and other types of cord. Among them, probably the most common type is a simple frame around which a user manually wraps a cord. Unfortunately, such frames are cumbersome, especially for long cords. Moreover, such frames can impose sharp bends that may damage the cord.

Other common cord storage devices include a spindle around which the cord is coiled. Some of these spindle-type devices automatically rewind the cord. However, such devices are typically either too fragile for heavy use or are expensive. In addition, when only a portion of an electrical cord is used, airflow is inhibited around the remaining tightly coiled portion. Consequently, heat may build up within the coiled portion, particularly when the cord is conducting a relatively high level of current. Heat build-up is problematic because it decreases the operating efficiency (i.e., increases the resistance) of the cord, reduces cord life, and can present a fire hazard.

Due to the aforementioned problems of the prior art, there exists a need for a simple, inexpensive cord storage and dispensing device that allows electrical cord to remain relatively cool under heavy use.

SUMMARY

The present invention is directed to a simple and inexpensive bag for storing and dispensing cord. The bag advantageously allows cord to be stored without sharp bends, prevents tangles, and facilitates easy storage and removal of cord. Moreover, the bag allows air to circulate among stored coils of cord, which can prevent excessive heat build-up when the bag contains a portion of an electrical cord that is in use.

The inventive bag includes a sidewall formed from a pliable sheet of material. The sidewall defines an interior compartment having a central portion for enclosing the cord. The sidewall includes a pair of apertures, each of which provides access to a respective end of the cord. In one embodiment, a resilient ring having sufficient stiffness to maintain the interior compartment in an at least partially uncollapsed shape when the bag lies on its side supports the central portion of the interior compartment.

In one embodiment, the interior compartment is defined between a pair of ends, each of which includes one of the apertures. At least one of the apertures is fitted with a means for closing the aperture (e.g., a drawstring). The cord is thus easily stuffed into the interior compartment and then secured within the interior compartment by closing the aperture. The second aperture need not be adjustable, but should be of sufficient size to admit an end of the cord. In one embodiment, the second aperture is included in an end cover attached to the sidewall.

This summary does not purport to define the invention. The invention is defined by the claims.

DETAILED DESCRIPTION

Figure 1:
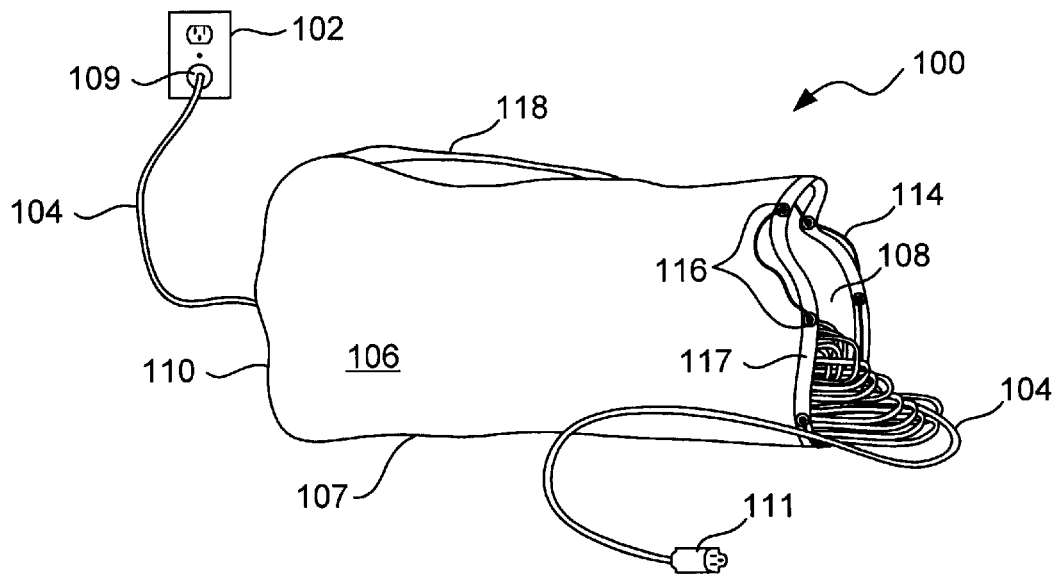
FIG. 1 shows a system 100 for providing electric power to a location remote from an electrical outlet 102.

FIG. 1 shows a system 100 for providing electric power to a location remote from an electrical outlet 102. The system includes an electrical cord 104 loosely stored within a generally cylindrical bag 106. Bag 106 includes a sidewall 107 formed from a pliable sheet of material. In one embodiment, sidewall 107 is formed from 600 denier vinyl-backed polyester. Other materials are also suitable, as will be apparent to those of skill in the art.

Cord 104 is placed within an interior compartment defined by bag 106 via an aperture 108 in a first end of bag 106. Cord 104 includes a first connector 109 (typically male) that extends through an aperture (see FIG. 2) in an end cover 110 of bag 106 to be inserted into outlet 102. Cord 104 also includes a second connector 111 (typically female) that extends from aperture 108. Cord 104 is typically stored within bag 106 so that connector 109 extends a short distance from aperture 108. Bag 106 also includes a drawstring 114 threaded through a number of grommets 116 in a double-folded casing 117. Drawstring 114 is drawn tight to close aperture 108, thereby securing cord 104 within bag 106. Thus configured, bag 106 and cord 104 are easily carried using a handle 118.

When a length of cord 104 is needed, drawstring 114 is released to enlarge aperture 108. The desired length of cord 104 is then withdrawn, leaving any remaining length of cord 104 conveniently stored and out of the way, thereby reducing fire and trip hazards associated with unrestrained cord.

Figure 2:
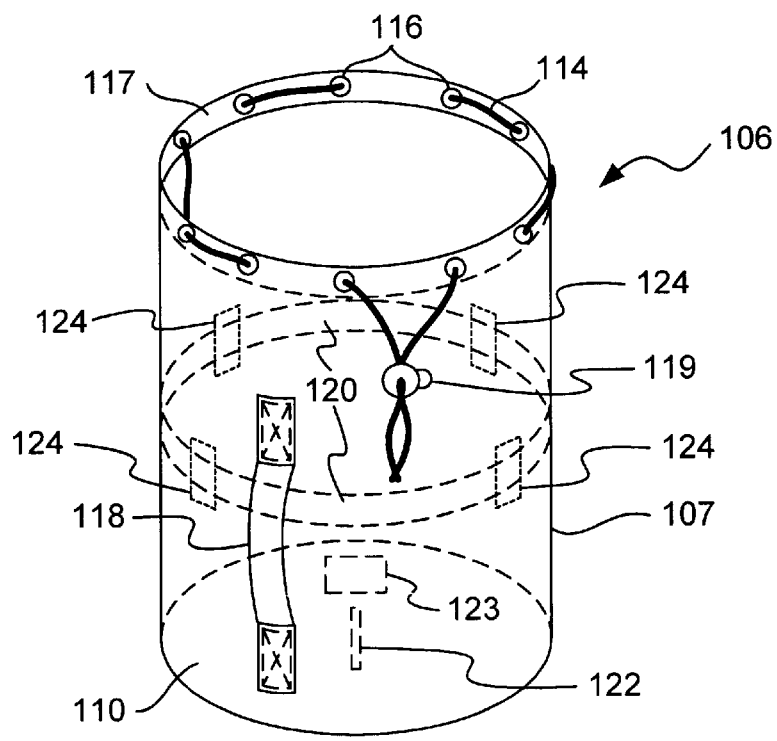
FIG. 2 is a schematic diagram of an embodiment of a bag 106.

FIG. 2 is a schematic diagram of an embodiment of bag 106. In addition to the features shown in FIG. 1, FIG. 2 includes a drawstring lock 119, an annular support 120, an aperture 122, and a cord-retaining element 123.

Drawstring lock 119 conventionally secures drawstring 114 to keep bag 106 closed. Aperture 122 is a slit in end cover 110 reinforced using conventional buttonhole stitching. Cord-retaining element 123 secures the portion of cord 104 extending from aperture 122 to the surface of end cover 110, and is in one embodiment a Velcro tab. For ease of assembly and replacement, support 120 is affixed to sidewall 107 via four Velcro tabs 124. Support 120 may be affixed inside or outside the interior compartment defined by bag 106. In other embodiments, one or both of aperture 122 and cord-retaining element 123 are located elsewhere on bag 106 or are eliminated altogether.

As is well known, Velcro fasteners conventionally include two layers of synthetic fabric, a "hook" layer and a "loop" layer. These hook and loop layers adhere to one another when pressed together. Tabs 124 are formed by attaching (e.g., sewing) one Velcro layer, either the hook or the loop layer, to bag 106. Then, support 120 is sandwiched between the attached layer and the remaining layer. Because the hook and loop layers must contact one another for adhesion, the hook and loop layers of tabs 124 extend beyond the edges of support 120 to contact one another. Cord-retaining element 123, also a Velcro tab, is similarly configured to restrain cord 104.

Bag 106 is similar to conventional rope bags used by rescue teams and mountain climbers. However, conventional rope bags tend to collapse under their own weight. In contrast, bag 106 does not collapse when lying on sidewall 107. This is due, in part, to the material used to form sidewall 107. However, in the embodiment of FIG. 2 an annular support 120 is attached to sidewall 107 around a central portion of the interior compartment defined by bag 106. Support 120, in one embodiment a polycarbonate ring, is of sufficient stiffness to maintain the interior compartment in an at least partially uncollapsed shape when the bag lies on sidewall 107. Support 120 is also resilient enough to withstand repeated deformation. The polycarbonate used to form support 120 is available from General Electric under the trademark "Lexan."

Inhibiting the collapse of bag 106 is important for several reasons. First, keeping bag 106 from collapsing on cord 104 eases insertion and extraction of cord 104. Second, the open inner compartment allows for fee circulation of air between loops of cord, thereby preventing excessive heat from building up within bag 106 when electrical current is conducted via cord 104.

Figure 3:
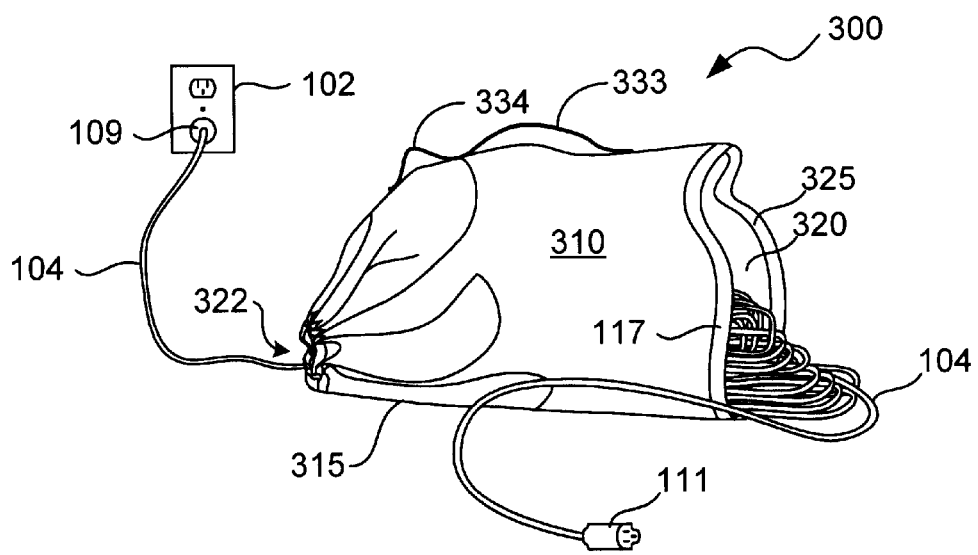
FIG. 3 shows a system 300 for providing electric power to a location remote from an electrical outlet 102.

FIG. 3 shows a system 300 for providing electric power to a location remote from an electrical outlet 102. System 300 includes a bag 310 in accordance with another embodiment of the invention. Many features depicted in FIG. 3 are similar to features in FIGS. 1 and 2, like-numbered elements being the same.

System 300 includes an electrical cord 104 loosely stored within a bag 310. Bag 310 includes a sidewall 315 formed from a pliable sheet of material. Cord 104 is placed within an interior compartment defined, at least in part, by sidewall 315. The interior compartment includes a first aperture 320 sufficiently large to accommodate coils of cord 104, this allowing a user of bag 310 to easily stuff cord 104 into bag 310. When cord 104 is in use, a first end of cord 104, typically a female connector 111, extends out of bag 310 through aperture 320. The interior compartment of bag 310 includes a second aperture 322 through which extends a second end of cord 104, typically a male connector 109. A handle 333 and cord-retaining element 334 are formed using a single polyester webbing strip attached to sidewall 315. Connector 109 can be passed through cord-retaining element 334 for storage.

Figure 4:
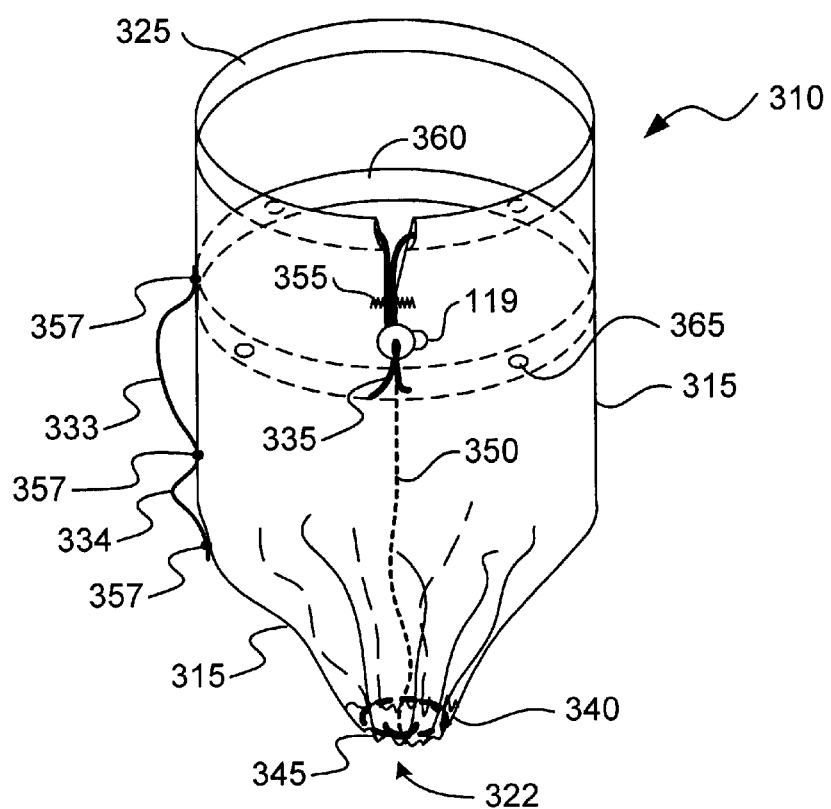
FIG. 4 illustrates an embodiment of bag 310 of FIG. 3.

FIG. 4 illustrates an embodiment of bag 310 of FIG. 3. Bag 310 includes a double-folded casing 325 around aperture 320 (FIG. 3). Casing 325 envelopes a drawstring 335 that can be drawn to close aperture 320, thereby securing a cord (e.g., an electrical cord or rope) within bag 310. Bag 310 also includes a second double-folded casing 340 around aperture 322. During manufacturing, a drawstring 345 within casing 340 is drawn to close aperture 322 to some desired size. Sidewall 315 is then sewn along a seam 350 to form the interior compartment. In this embodiment, the diameter of aperture 322 is fixed at a diameter sufficient to admit connector 109. Additional stitching 355 is provided across seam 350 to improve the durability of seam 350. Similar stitching 357 secures handle 333 and cord-retaining element 334 to sidewall 315. Drawstring 345 and casing 340 can be replaced with other types of aperture-defining members, as will be understood by those of skill in the art.

The embodiments of FIGS. 3 and 4 do not include a separated end cover, and can therefore be manufactured using a single sheet of material to form the bag. This design advantageously reduces manufacturing costs.

As in the embodiment of FIGS. 3 and 4, bag 310 may include an annular support affixed inside or outside the interior compartment of bag 310. In the embodiment of FIG. 4, an annular support 360 is affixed inside the interior compartment using four metal rivets 365.

Figure 5:
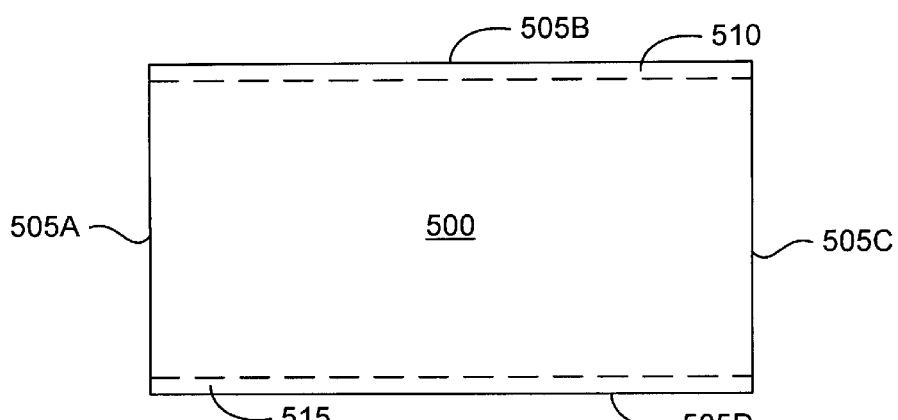
FIG. 5 is a plan view of a sidewall 500 that may be used in accordance with one embodiment to define a bag for storing and dispensing cord.

FIG. 5 is a plan view of a sidewall 500 that may be used in accordance with one embodiment to define a bag for storing and dispensing cord. Sidewall 500 is substantially rectangular, and includes four edges 505A–D, two of which include casings 510 and 515. The remaining edges 505A and 505C are joined together, typically by sewing, to form the interior compartment of a cord bag. Casings 510 and 515 are then used to form the two apertures for admitting the cord ends, as described in FIGS. 3 and 4.

Figure 6:
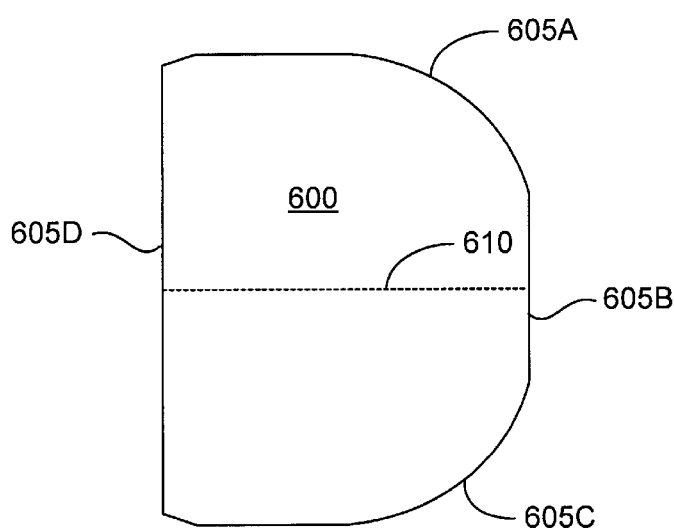
FIG. 6 is a plan view of a sidewall 600 that may be used in accordance with another embodiment to define a bag for storing and dispensing cord.

FIG. 6 is a plan view of a sidewall 600 that may be used in accordance with another embodiment to define a bag for storing and dispensing cord. Sidewall 600 includes four edges 605A–D. Sidewall 600 is folded along a line 610 and edges 605A and 605C are joined together to form the interior compartment of a cord bag. The remaining edges 605B and 605D then define the two apertures.

Figure 7:
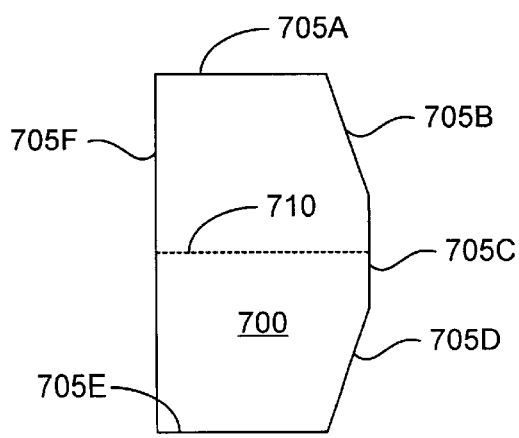
FIG. 7 is a plan view of a sidewall 700 that may be used in accordance with yet another embodiment to define a bag for storing and dispensing cord.

FIG. 7 is a plan view of a sidewall 700 that may be used in accordance with yet another embodiment to define a bag for storing and dispensing cord. Sidewall 700 includes six edges 705A–F. Sidewall 700 is folded along a line 710 and edges 705A and 705B are joined with respective edges 705E and 705D to form the interior compartment of a cord bag. The remaining edges 705F and 705C then define the two apertures.

Figure 8:
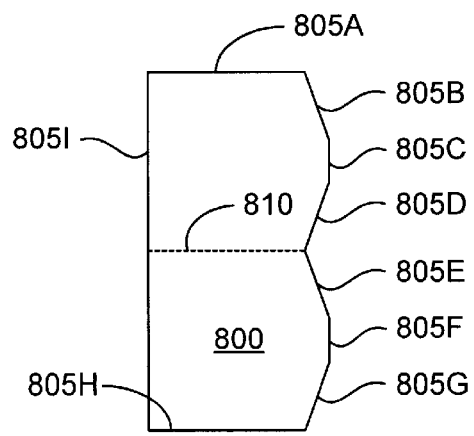
FIG. 8 is a plan view of a sidewall 800 that may be used in accordance with still another embodiment to define a bag for storing and dispensing cord.

FIG. 8 is a plan view of a sidewall 800 that may be used in accordance with still another embodiment to define a bag for storing and dispensing cord. Sidewall 800 includes nine edges 805A–I. Edges 805A, 805B, and 805D are joined with respective edges 805H, 805G, and 805E to form the interior compartment of a cord bag. The remaining edge 805I and the pair of edges 805C and 805F then define the two apertures.

Although the present invention has been described in considerable detail with reference to certain versions, other versions are possible. For example, the bag shapes created by the sidewalls of FIGS. 1–8 are illustrative; many other shapes might be used, as will be apparent to those of skill in the art. Hence, the scope of the appended claims is not limited to the description of the embodiments described above.

What is claimed is:

1. A bag comprising:
   a. a sidewall formed from a pliable sheet of material, the sheet formed to define an interior compartment having a first end, a second end, and a central portion defined between the first and second ends;

b. a support attached to the sidewall around the central portion of the interior compartment, the support having sufficient stiffness to maintain the interior compartment in an at least partially uncollapsed shape when the bag lies on the sidewall;

c. a first aperture in the first end adapted to admit access to the interior compartment; and d. a second aperture in the second end adapted to admit access to the interior compartment.

2. The bag of claim 1, further comprising a handle attached to the sidewall.

3. The bag of claim 1, wherein the interior compartment is of sufficient size to receive and store a length of cord having first and second cord ends, the bag further comprising a cord-end retaining element.

4. The bag of claim 3, wherein the first aperture is of a size sufficient to admit one of the first and second cord ends.

5. The bag of claim 1, wherein the first aperture comprises a casing supporting a drawstring, the drawstring and the casing for selectively closing the first end.

6. The bag of claim 5, wherein the second aperture comprises a casing supporting an aperture-defining member of a fixed size.

7. A system comprising:

a. a length of cord having first and second cord ends;

b. a sidewall formed from a first pliable sheet of material, the sheet defining an interior compartment having first and second compartment ends and a portion defined between the first and second ends, the interior compartment receiving and storing the cord;

c. a support attached to the sidewall around the interior compartment and between the first and second compartment ends, the support having sufficient stiffness to maintain the interior compartment in an at least partially uncollapsed shape when the bag lies on the sidewall;

d. a first aperture defined in the sidewall and admitting the first cord end; and e. a second aperture defined in the sidewall and admitting the second cord end.

8. The system of claim 7, wherein the cord is an electrical cord.

9. The bag of claim 7, further comprising a cord retaining element for securing the cord to the sidewall.

10. The bag of claim 7, wherein the first end is open to the interior compartment, and wherein the first end comprises a casing supporting a drawstring, the drawstring and the casing for selectively closing the first end.

11. The bag of claim 7, wherein the support is made of a polycarbonate.

12. The bag of claim 11, wherein the interior compartment of the bag is a cylinder of a circumference and wherein the support is an annular member attached to the sidewall coincident with the circumference.

13. A system comprising:

a. a length of cord having first and second cord ends;

b. a sidewall formed from a pliable sheet of material, the sheet having:

i. first and second opposite sheet edges joined to form an interior compartment adapted to store the cord;

ii. a third sheet edge defining a first aperture through which extends the first cord end;

iii. a fourth sheet edge defining a second aperture through which extends the second cord end; and iv. a support attached to the sidewall around the interior compartment and between the first and second apertures.

14. The system of claim 13, wherein the third sheet edge includes a casing supporting a drawstring, the drawstring and the casing for selectively closing the first aperture.

15. The system of claim 13, wherein the fourth sheet edge includes a casing supporting an aperture-defining member adapted to retain the second aperture at a fixed diameter.

16. The system of claim 15, wherein the aperture-defining member comprises a drawstring.

17. The system of claim 13, wherein the cord is at least one of an electrical cord or a rope.

* * * * *